United States Patent
Koo

(10) Patent No.: US 9,272,661 B2
(45) Date of Patent: Mar. 1, 2016

(54) VEHICULAR LAMP ANGLE-ADJUSTING MECHANISM

(71) Applicant: TRICORE CORPORATION, Hwa Tang Township (TW)

(72) Inventor: Ting-Yi Koo, Hwa Tang Township (TW)

(73) Assignee: Tricore Corporation, Hwa Tang Township, Chang Hua County (TW)

( * ) Notice: Subject to any disclaimer, the term of this patent is extended or adjusted under 35 U.S.C. 154(b) by 502 days.

(21) Appl. No.: 13/727,165

(22) Filed: Dec. 26, 2012

(65) Prior Publication Data

US 2014/0174219 A1    Jun. 26, 2014

(51) Int. Cl.
  *F16H 19/08*  (2006.01)
  *B60Q 1/076*  (2006.01)
(52) U.S. Cl.
  CPC ........... *B60Q 1/076* (2013.01); *Y10T 74/18568* (2015.01)
(58) Field of Classification Search
  CPC ................................. B60Q 1/076; F16H 19/08
  See application file for complete search history.

(56) References Cited

U.S. PATENT DOCUMENTS

2002/0064051 A1\* 5/2002 Sugimoto et al. ............. 362/467
2015/0217676 A1\* 8/2015 Tajima ......................... 74/89.14

FOREIGN PATENT DOCUMENTS

EP          1516782     \*  3/2005  ............. B60Q 1/076

\* cited by examiner

*Primary Examiner* — Terence Boes
(74) *Attorney, Agent, or Firm* — Muncy, Geissler, Olds & Lowe, P.C.

(57) ABSTRACT

A vehicular lamp angle-adjusting mechanism includes a driving unit having a motor and a motor gear connected with the motor, a transmission unit having a transmission gear shaft and a middle gear connected with the transmission gear shaft, and an output unit. The motor gear is engaged with the middle gear so that the motor in operation can transmit power to the transmission gear shaft. The output unit has an output gear engaged with the transmission gear shaft and an output shaft connected with the output gear so that the transmission gear shaft can drive the output gear to force a vehicular lamp to pivot through the output shaft. As a result, the vehicular lamp angle-adjusting mechanism provided by the present invention is structurally simplified and space-saving.

10 Claims, 6 Drawing Sheets

VEHICULAR LAMP ANGLE-ADJUSTING MECHANISM

BACKGROUND OF THE INVENTION

1. Field of the Invention

The present invention relates generally to a vehicular lamp angle-adjusting mechanism and more particularly, to a space-saving vehicular lamp angle-adjusting mechanism.

2. Description of the Related Art

Vehicular lamps are important lighting devices for maintaining good visibility of a driver to enable the driver see pedestrians, other vehicles, road signs, or barriers clearly. Besides, the vehicular lamps must prevent the light from projection straight onto the eyes of drivers in other vehicles running in the opposite lane to further avoid light pollution. Therefore, the vehicular lamps should be able to adjust angles thereof to assure safety of the drivers on the road.

A conventional angle-adjusting mechanism for adjusting the angles of vehicular lamps primarily comprises a motor, an output shaft, and a reduction gear set which can reduce the output rotational speed of the motor and then transmit it to the output shaft to make the vehicular lamps pivot. However, the arrangement of aforesaid components occupies much space so as to influence the space arrangement of other parts and components of the vehicle. Besides, aforesaid conventional vehicular lamp angle-adjusting mechanism has overabundant parts and components to become complicated in structure, so such vehicular lamp angle-adjusting mechanism needs to be further improved.

SUMMARY OF THE INVENTION

It is an objective of the present invention to provide a vehicular lamp angle-adjusting mechanism which is structurally simplified and space-saving.

To attain the above objective, the present invention provides a vehicular lamp angle-adjusting mechanism, which comprises a housing, a driving unit, a transmission unit, and an output unit. The driving unit comprises a motor fastened to the housing and a motor gear having two ends, one of which is connected with the motor and the other is inserted into the housing perpendicularly to a horizontal surface of the housing so that the motor gear can be driven for rotation by the motor. The transmission unit is rotatably mounted in the housing and comprises a transmission gear shaft and a middle gear which is connected with an end of the transmission gear shaft and engaged with the motor gear of the driving unit so that the middle gear can be driven by the motor gear for rotation to make synchronic rotation of the transmission gear shaft. The output unit comprises an output gear mounted in the housing and engaged with the transmission gear shaft of the transmission unit and an output shaft having two ends, one of which is inserted into the housing and connected with the output gear and the other is connected with the vehicular lamp so that the output gear can adjust the angle of the vehicular lamp via the output shaft while driven by the transmission gear shaft. As a result, the perpendicular arrangement of the motor and the housing and the engagement of the motor gear with the middle gear can greatly reduce the size of the vehicular lamp angle-adjusting mechanism provided by the present invention to make the mechanism structurally simplified and be space-saving.

In a preferred embodiment of the present invention, the output gear comprises a first gear piece, a second gear piece, and a compressed spring. The first and second gear pieces are superposed on each other and engaged with the transmission gear shaft at the same time. The compressed spring is mounted between the first and second gear pieces for providing elastic force to push the first and second gear pieces toward opposite directions so that the first and second gear pieces can be securely engaged with the transmission gear shaft to eliminate backlash.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
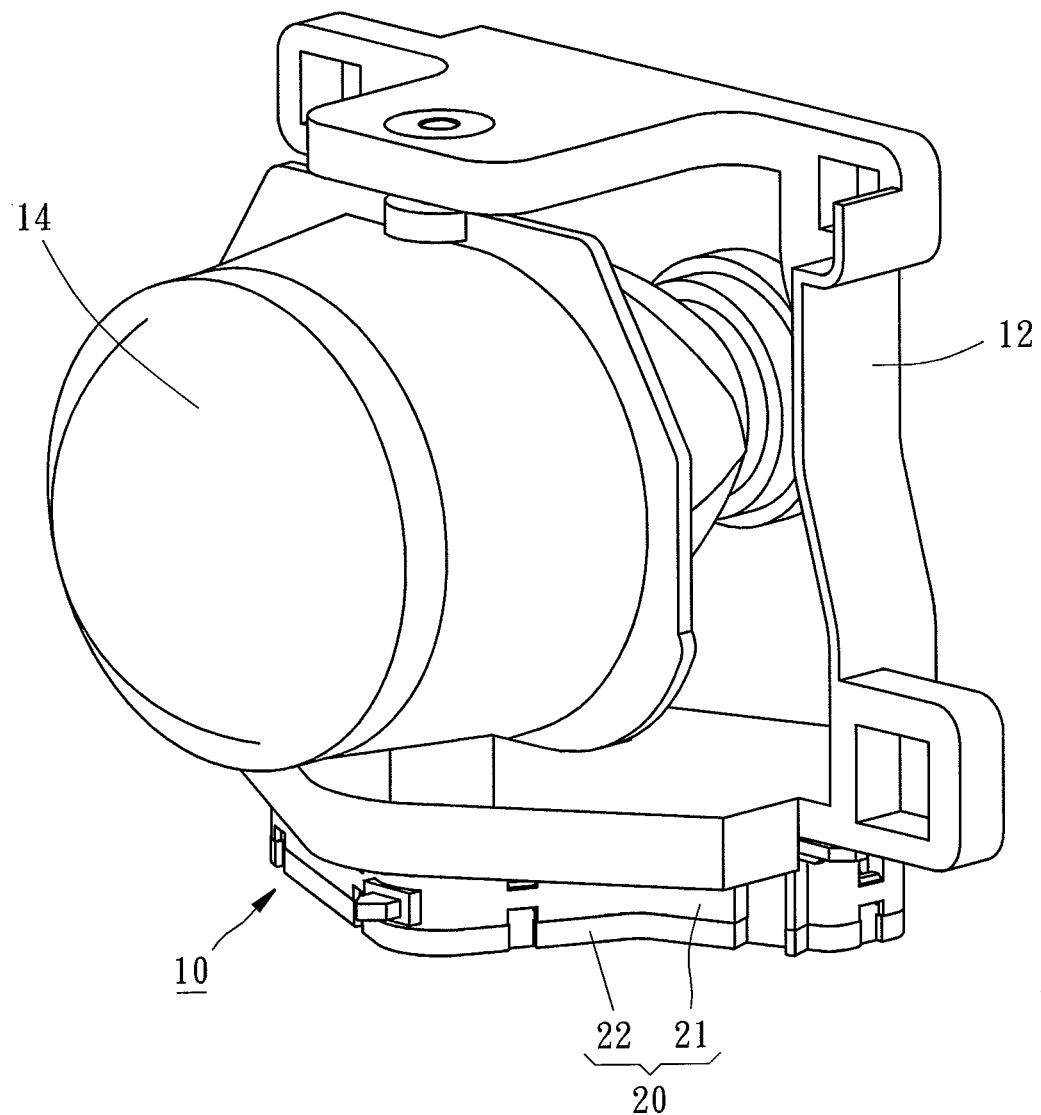
FIG. 1 is a perspective view of a vehicular lamp using a vehicular lamp angle-adjusting mechanism provided by a first preferred embodiment of the present invention.
Figure 2:
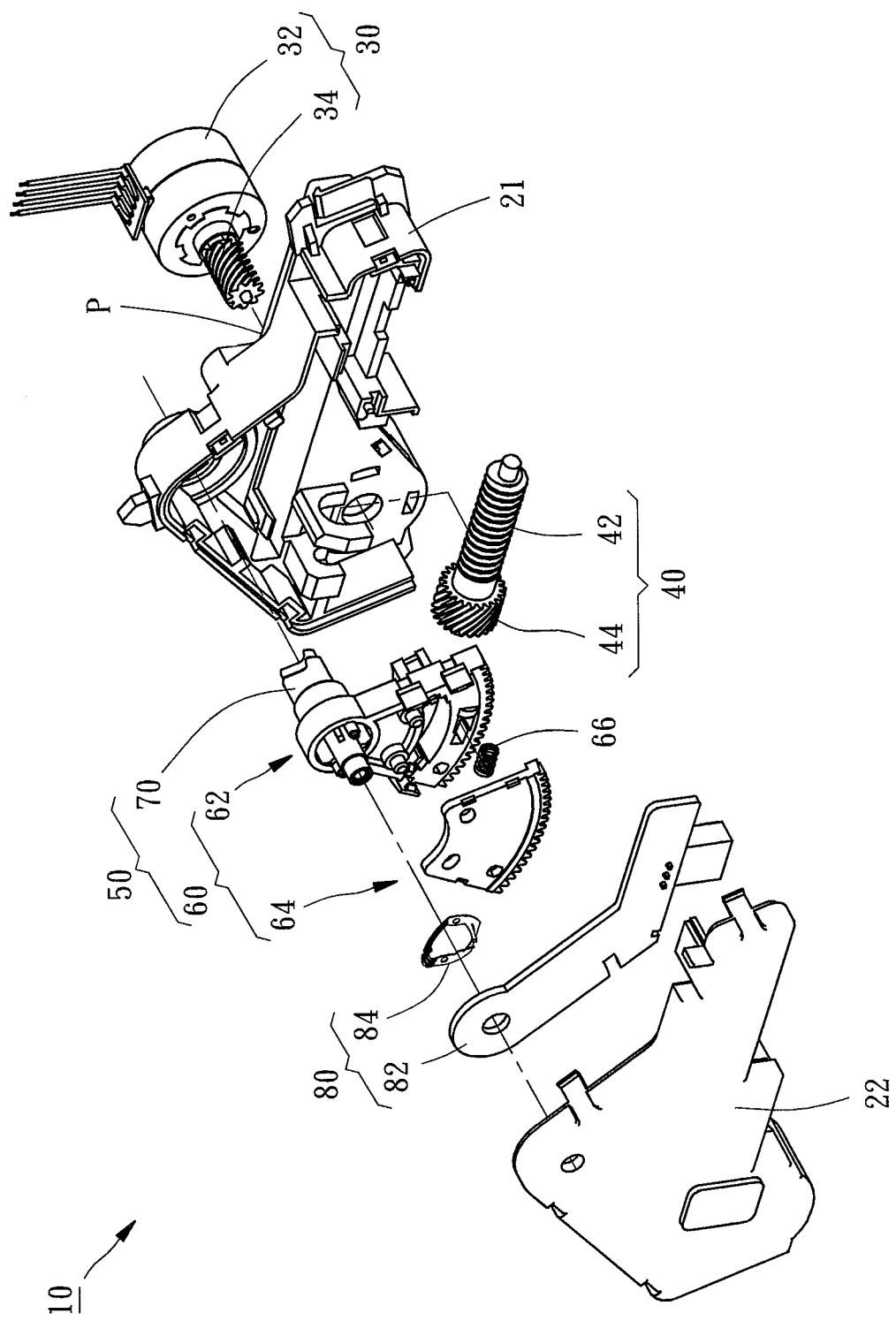
FIG. 2 is an exploded perspective view of the vehicular lamp angle-adjusting mechanism provided by the first preferred embodiment of the present invention.

Referring to FIGS. 1-2, a vehicular lamp angle-adjusting mechanism 10, which is provided by a first preferred embodiment of the present invention, comprises a housing 20, a driving unit 30, a transmission unit 40, and an output unit 50.

The housing 20 comprises a base 21 and a cover 22. The base 21 is fastened to a bottom of a vehicular lamp holder 12 and provided with a horizontal surface P. The cover 22 is mounted to a side of the base 21.

The driving unit 30 comprises a motor 32 and a motor gear 34. The motor 32 is fastened to the horizontal surface P of the base 21 of the housing 20 and serves as a power source. In this embodiment, the motor gear 34 is a worm having two ends, one of which is connected with the motor 32 and the other is inserted into the housing 20 perpendicularly to the horizontal surface P of the base 21 so that the motor gear 34 can be driven by the motor 32 to rotate in situ.

The transmission unit 40 is rotatably mounted in the housing 20 and comprises a transmission gear shaft 42 and a middle gear 44. In this embodiment, the transmission gear shaft 42 is a worm and the middle gear 44 is a helical gear. The middle gear 44 is connected with an end of the transmission gear shaft 42 and engaged with the motor gear 34 of the driving unit 30. As a result, when the motor gear 34 starts to rotate, the middle gear 44 is driven to rotate by the motor gear 34 and then drives the transmission gear shaft 42 to rotate synchronically.

It should be additionally remarked here that the motor gear 34 and the middle gear 44 are not limited to the worm and the helical gear respectively and can be two helical gears engaged with each other orthogonally to reach the same effect.

Figure 3:
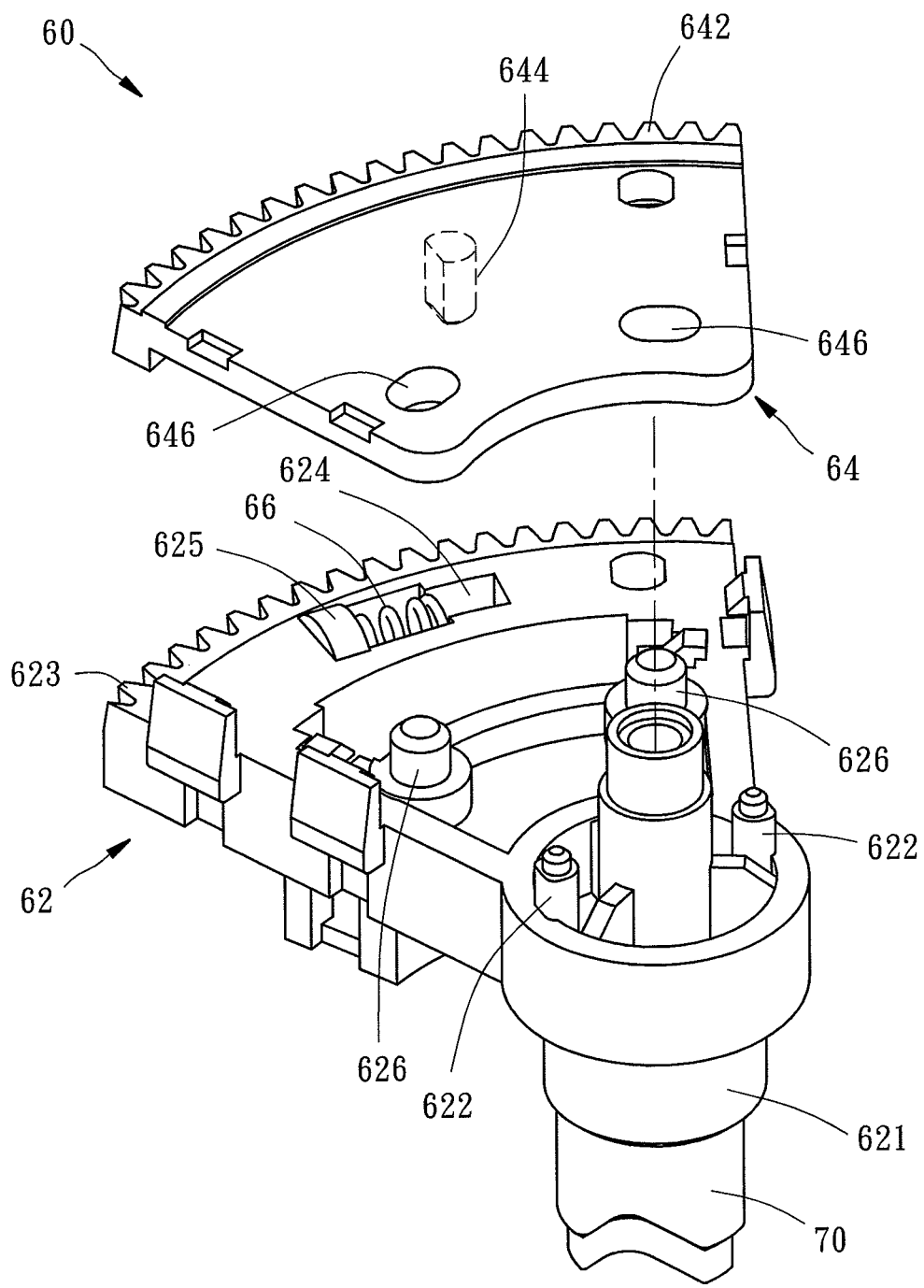
FIG. 3 is an exploded perspective view of parts of an output gear of the vehicular lamp angle-adjusting mechanism provided by the first preferred embodiment of the present invention.
Figure 4:
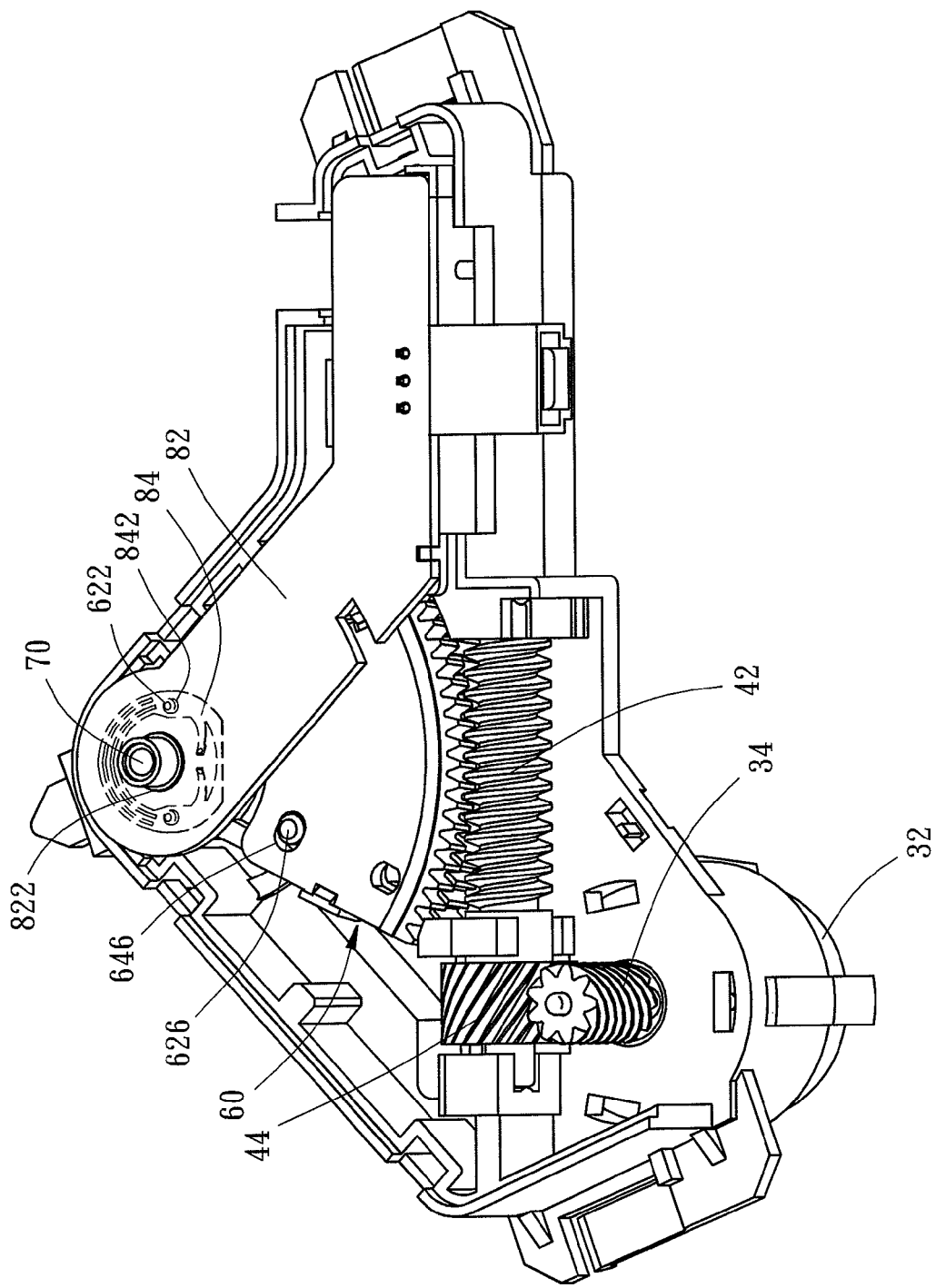
FIG. 4 is a top perspective view of the vehicular lamp angle-adjusting mechanism provided by the first preferred embodiment of the present invention, a cover of which is not shown.
Figure 5:
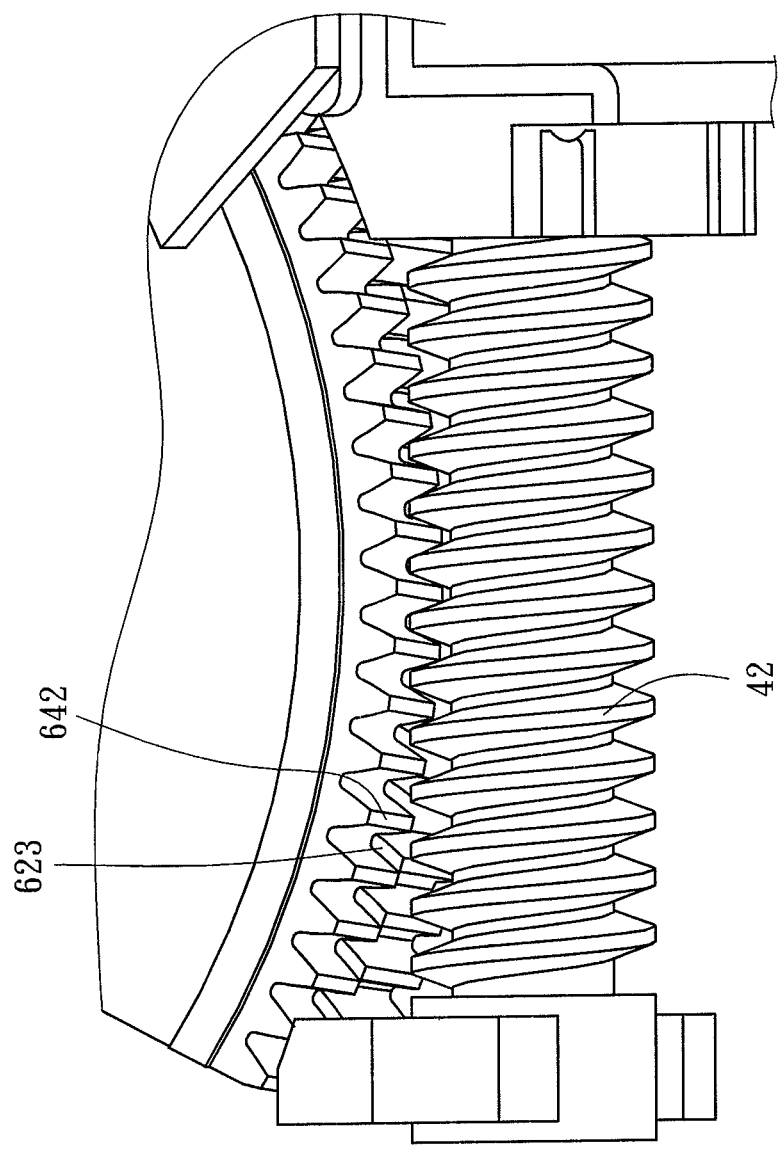
FIG. 5 is a partially enlarged perspective view of parts of the vehicular lamp angle-adjusting mechanism provided by the first preferred embodiment of the present invention, illustrating the engagement among a first gear piece, a second gear piece, and a transmission gear shaft.

The output unit 50 comprises an output gear 60 and an output shaft 70. As shown in FIGS. 3-5, the output gear 60 comprises a first gear piece 62, a second gear piece 64, and a compressed spring 66.

The first gear piece 62 has a fixed shaft 621 at a side thereof, two locating poles 622 protruding from respective opposite edges of the fixed shaft 621, and an arc-shaped first gear portion 623 formed at an opposite side of the first gear piece 62 relatively to the fixed shaft 621 and engaged with the transmission gear shaft 42. Besides, the first gear piece 62 has a trough 624 and a first projection 625, which are adjacent to the first gear portion 623, and two inserting poles 626 located opposite to each other and on a middle section of the first gear piece 62.

The second gear piece 64 has an arc-shaped second gear portion 642 formed at a side of the second gear piece 64 and engaged with the transmission gear shaft 42. Besides, the second gear piece 64 has a second projection 644 adjacent to the second gear portion 642 and two constraint holes 646 located opposite to each other and running through an opposite side of the second gear piece 64 relatively to the second gear portion 642. The inserting poles 626 are inserted into the constraint holes 646 respectively so that the first and second gear pieces 62, 64 are superposed on each other. In this way, the second projection 644 of the second gear piece 64 and the first projection 625 of the first gear piece 62 are located opposite to each other and adjacent to two ends of the trough 624 of the first gear piece 62, respectively.

The compressed spring 66 is mounted in the trough 624 with a part thereof exposed outside the trough 624 and has two ends abutting against the first projection 625 of the first gear piece 62 and the second projection 644 of the second gear piece 64, respectively, providing elastic force to push the first and second gear pieces 62, 64 toward opposite directions. In this way, the first gear portion 623 of the first gear piece 62 and the second gear portion 642 of the second gear piece 64 keep tightly engaged with the transmission gear shaft 42, as shown in FIG. 5.

The output shaft 70 has two ends, one of which is inserted into the housing 20 and fixedly inserted into the fixed shaft 621 of the first gear piece 62, as shown in FIGS. 2-3, and the other is connected with a vehicular lamp 14 for driving the vehicular lamp 14 to work synchronically.

It should be particularly mentioned that in this embodiment, the motor gear 34 is substantially parallel to the output shaft 70 and the transmission gear shaft 42 is substantially perpendicular to the motor gear 34 and the output shaft 70.

After the motor 32 is activated, the kinetic energy outputted by the motor 32 is transmitted to the middle gear 44 through the motor gear 34 and the engagement of the motor gear 34 with the middle gear 44 leads to speed reduction. Next, the middle gear 44 drives the transmission gear shaft 42 to rotate synchronically; at the same time, the engagement of the first and second gear portions 623, 642 of the first and second gear pieces 62, 64 with the transmission gear shaft 42 makes the output gear 60 pivot. When the transmission gear shaft 42 drives the output gear 60, the compressed spring 66 forces the first and second gear portions 623, 642 to keep tight engagement with the transmission gear shaft 42 to further eliminate backlash. In this way, the transmission gear shaft 42 can stably drive the output gear 60 to pivot even though a vibration occurs in the process of the aforesaid transmission of the kinetic energy, and then the output gear 60 can further adjust the angle of the vehicular lamp 14 via the output shaft 70.

Furthermore, according to actual needs, the vehicular lamp angle-adjusting mechanism 10 can further comprise an angle-sensitive unit 80 mounted in the housing 20 for enabling the driver to be aware of how much angle the vehicular lamp 14 pivots. In this embodiment, the angle-sensitive unit 80 comprises a circuit board 82 and an electric brush 84. As shown in FIGS. 2-4, the circuit board 82 is mounted in the housing 20 and has a through hole 822 where the output shaft 70 is inserted; the electric brush 84 is sleeved onto the output shaft 70 and electrically touches the circuit board 82. Besides, the electric brush 84 has two opposite locating holes 842 for inserting the locating poles 622 of the first gear piece 62. When the output gear 60 starts to pivot, the electric brush 84 is driven by the first gear piece 62 to rotate synchronically; meanwhile, the electric brush 84 touches the circuit board 82 to generate and transmit an induction signal in the process of the synchronic rotation of the electric brush 84 to a controller. In this way, the controller can indicate the angle for which the vehicular lamp 14 pivots according to the induction signal.

Figure 6:
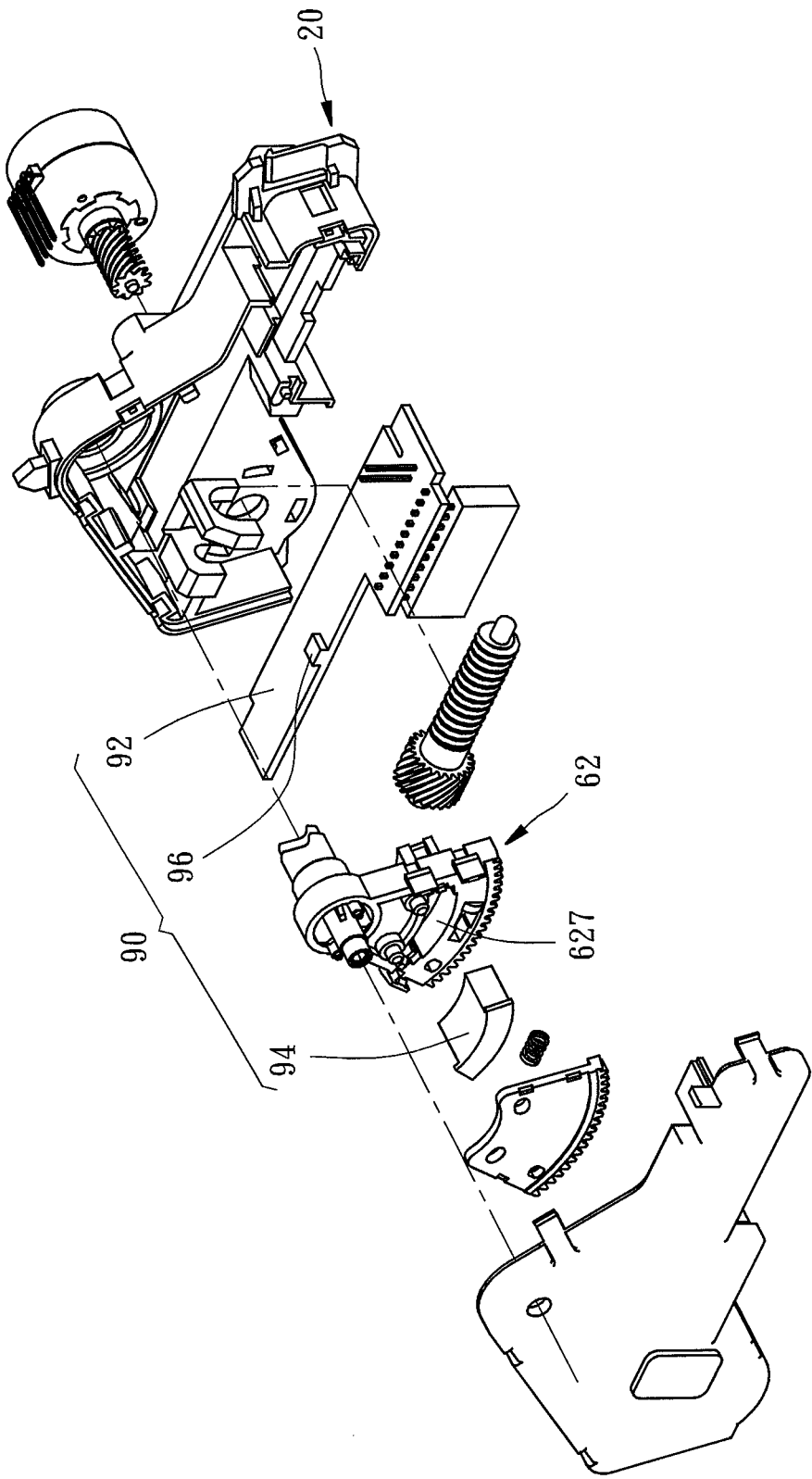
FIG. 6 is an exploded perspective view of a vehicular lamp angle-adjusting mechanism provided by a second preferred embodiment of the present invention.

However, it should be additionally remarked here that the angle-sensitive unit 80 applied to the present invention is not limited to the aforesaid touch-type structure but can be another type. For example, as shown in FIG. 6, an angle-sensitive unit 90 of the vehicular lamp angle-adjusting mechanism provided by a second preferred embodiment of the present invention comprises a circuit board 92, a magnetic member 94, and a magnetic sensor 96. The circuit board 92 is mounted in the housing 20. The magnetic member 94, such as a magnet, is fixedly inserted into a slot 627 of the first gear piece 62. The magnetism sensor 96, such as a Hall sensor, is electrically connected with the circuit board 92 and located opposite to the magnetic member 94. In this way, the magnetic member 94 can rotate synchronically with the first gear piece 62 and meanwhile, the magnetic sensor 96 can detect the variation of magnetic field and then transmit an induction signal to a controller through the circuit board 92 so that the controller can indicate the angle for which the vehicular lamp 14 pivots according to the induction signal.

In conclusion, the perpendicular arrangement of the motor 32 and the housing 20 and the speed reduction resulting from the simple coordination of the motor gear 34, the middle gear 44, and the transmission gear shaft 42 enable the vehicular lamp angle-adjusting mechanism 10 provided by the present invention to have simple structure and reduced size to be space-saving. Besides, the compressed spring 66 mounted between the first and second gear pieces 62, 64 of the output gear 60 is small to eliminate the backlash, so the first and second gear pieces 62, 64 of the output gear 60 can be tightly engaged with the transmission gear shaft 42 to result in the stable and smooth transmittance of kinetic energy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A vehicular lamp angle-adjusting mechanism comprising:
a housing defining a horizontal surface;
a driving unit having a motor fastened to the housing and a motor gear having two ends, one of which is connected with the motor and the other is inserted into the housing perpendicularly to the horizontal surface of the housing;
a transmission unit rotatably mounted in the housing and having a transmission gear shaft and a middle gear, the middle gear being connected with an end of the transmission gear shaft and engaged with the motor gear of the driving unit; and an output unit having an output gear mounted in the housing and engaged with the transmission gear shaft of the transmission unit, and an output shaft having an end inserted into the housing and connected with the output gear, wherein the transmission unit is mounted in the housing in a way that the transmission unit is substantially parallel to the horizontal surface of the housing wherein the output gear comprises a first gear piece connected with the output shaft, a second gear piece, and a compressed spring, the first and second gear pieces being superposed on each other and engaged with the transmission gear shaft at the same time, the compressed spring being mounted between the first and second gear pieces for providing elastic force to push the first and second gear pieces toward opposite directions, wherein the vehicular lamp angle-adjusting mechanism adjusts an angle of the vehicular lamp.

2. The vehicular lamp angle-adjusting mechanism as claimed in claim 1, wherein the first gear piece has a trough and a first projection; the second gear piece has a second projection opposite to the first projection; the compressed spring is mounted in the trough and has two ends abutting against the first projection of the first gear piece and the second projection of the second gear piece, respectively.

3. The vehicular lamp angle-adjusting mechanism as claimed in claim 1, wherein the first gear piece has at least an inserting pole and the second gear piece has at least a constraint hole where the inserting pole is inserted.

4. The vehicular lamp angle-adjusting mechanism as claimed in claim 1, wherein the first gear piece has an arc-shaped first gear portion and the second gear piece has an arc-shaped second gear portion, the first and second gear portions being engaged with the transmission gear shaft at the same time.

5. The vehicular lamp angle-adjusting mechanism as claimed in claim 1 further comprising an angle-sensitive unit mounted in the housing for detecting the angle for which the first gear piece pivots.

6. The vehicular lamp angle-adjusting mechanism as claimed in claim 5, wherein the angle-sensitive unit comprises a circuit board mounted in the housing and an electric brush mounted to the first gear piece of the output unit and electrically touching the circuit board.

7. The vehicular lamp angle-adjusting mechanism as claimed in claim 6, wherein the circuit board has a through hole where the output shaft is inserted; the electric brush is sleeved onto the output shaft and has at least one locating hole; the first gear piece has at least one locating pole inserted in the locating hole.

8. The vehicular lamp angle-adjusting mechanism as claimed in claim 5, wherein the angle-sensitive unit comprises a circuit board mounted in the housing, a magnetic member mounted to the first gear piece of the output unit, and a magnetic sensor electrically connected with the circuit board and located opposite to the magnetic member.

9. The vehicular lamp angle-adjusting mechanism as claimed in claim 8, wherein the first gear piece has a slot and the magnetic member is inserted into the slot.

10. The vehicular lamp angle-adjusting mechanism as claimed in claim 1, wherein the motor gear is a worm, and the middle gear is a helical gear.

* * * * *